(12) United States Patent
Fukushima

(10) Patent No.: US 6,958,778 B2
(45) Date of Patent: Oct. 25, 2005

(54) IRIS CONTROL METHOD AND APPARATUS FOR TELEVISION CAMERA FOR CONTROLLING IRIS OF LENS ACCORDING TO VIDEO SIGNAL, AND TELEVISION CAMERA USING THE SAME

(75) Inventor: Akira Fukushima, Ome (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 676 days.

(21) Appl. No.: 09/988,992

(22) Filed: Nov. 21, 2001

(65) Prior Publication Data

US 2002/0060744 A1   May 23, 2002

(30) Foreign Application Priority Data

Nov. 21, 2000 (JP) .............................. 2000-355002

(51) Int. Cl.[7] .......................................... H04N 5/238
(52) U.S. Cl. ..................... 348/363; 348/364; 348/350
(58) Field of Search ............................... 348/362, 363, 348/211.9, 211.1, 224.1, 364, 350

(56) References Cited

U.S. PATENT DOCUMENTS

| | | | |
|---|---|---|---|
| 4,959,727 A | * | 9/1990 | Imaide et al. ............ 348/229.1 |
| 5,184,172 A | * | 2/1993 | Miyazaki .................... 396/234 |
| 5,396,288 A | | 3/1995 | Tsugita et al. |
| 5,420,635 A | | 5/1995 | Konishi et al. |
| 5,589,880 A | | 12/1996 | Tsukui |
| 5,694,167 A | * | 12/1997 | Hashimoto .................. 348/297 |
| 5,929,908 A | | 7/1999 | Takahashi et al. |
| 6,747,694 B1 | | 6/2004 | Nishikawa et al. |
| 6,825,884 B1 | * | 11/2004 | Horiuchi ..................... 348/362 |

FOREIGN PATENT DOCUMENTS

| | | |
|---|---|---|
| JP | 429125 | 1/1992 |
| JP | 575931 | 3/1993 |
| JP | 8321986 | 12/1996 |
| JP | 11205661 | 7/1999 |
| JP | 11355785 | 12/1999 |

* cited by examiner

*Primary Examiner*—Ngoc-Yen Vu
*Assistant Examiner*—Hung H. Lam
(74) *Attorney, Agent, or Firm*—Mattingly, Stanger, Malur & Brundidge, P.C.

(57) ABSTRACT

An image frame of a long-time exposure video signal from a solid stage imaging device outputting the long-time exposure video signal and a short-time exposure video signal on a time division basis is divided into a plurality of predetermined areas, and a first area in which a luminance level of the long-time exposure video signal becomes minimal is detected from a plurality of areas of the image frame. Different weighting is applied to the long-time exposure video signal of the first area and to the long-time exposure video signal of a second area other than the detected first area among a plurality of areas of the image frame, and an iris of a lens for condensing the light beams is controlled in accordance with the long-time exposure video signal so weighted.

12 Claims, 6 Drawing Sheets

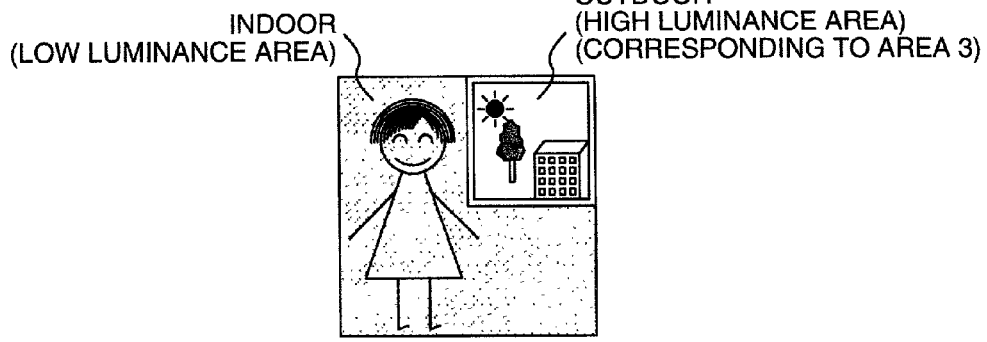
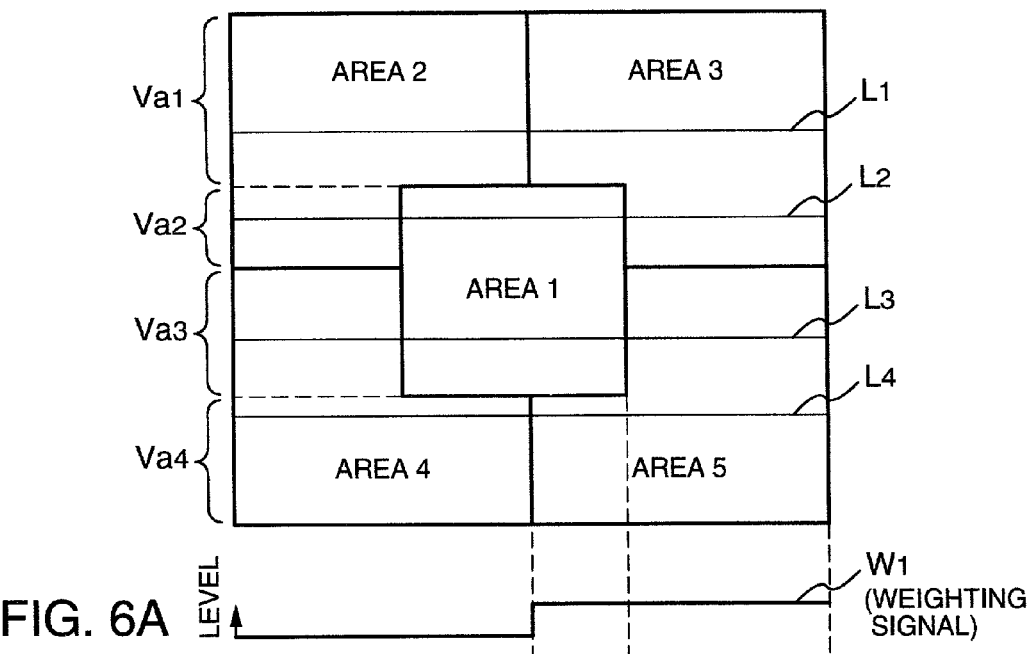
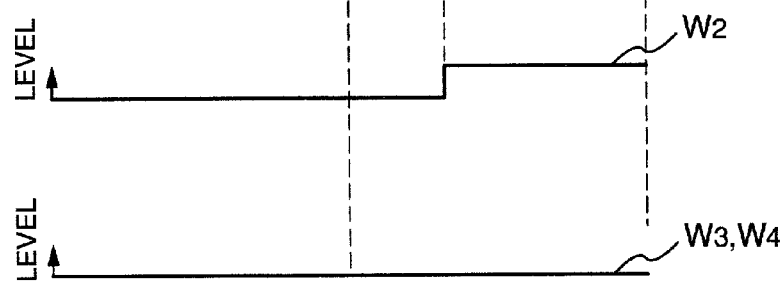

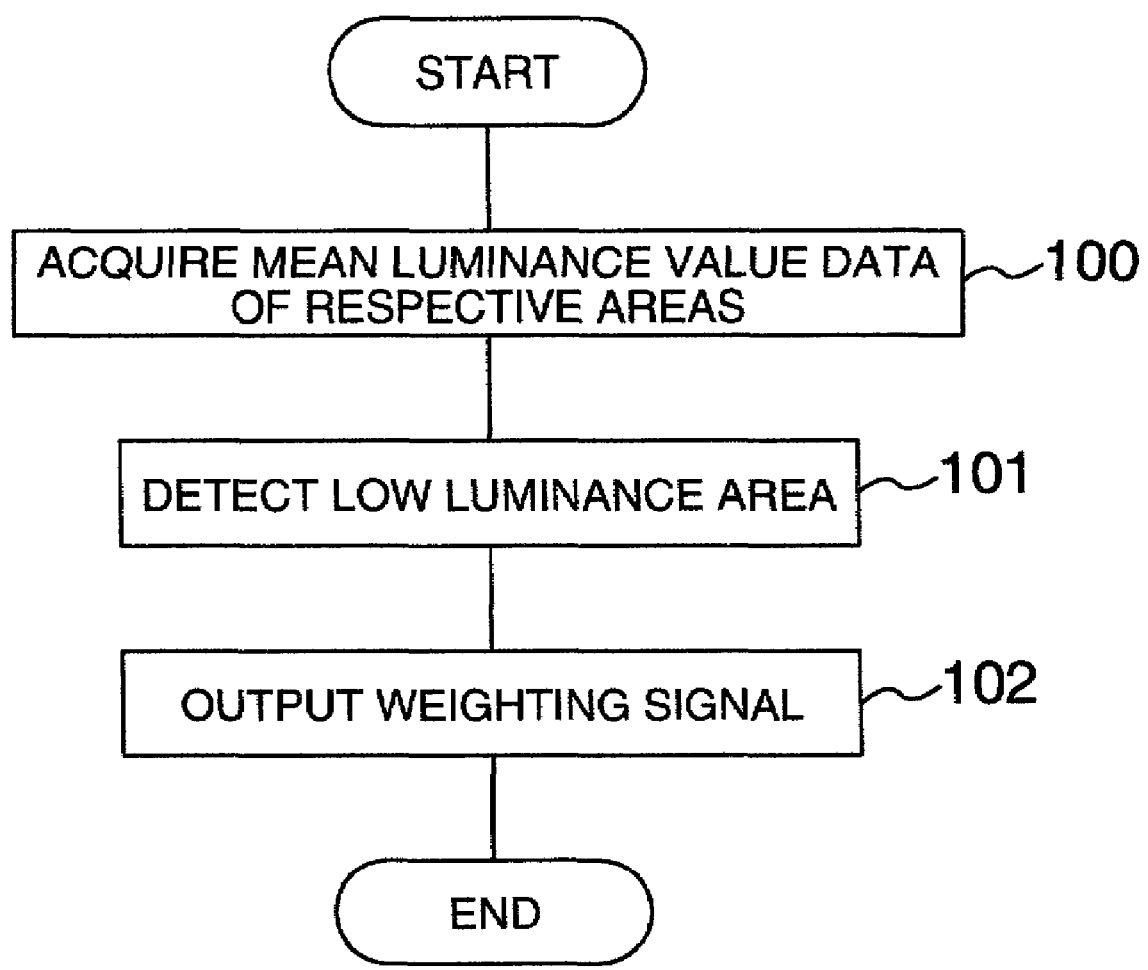

IRIS CONTROL METHOD AND APPARATUS FOR TELEVISION CAMERA FOR CONTROLLING IRIS OF LENS ACCORDING TO VIDEO SIGNAL, AND TELEVISION CAMERA USING THE SAME

CROSS-REFERENCE TO RELATED APPLICATION(S)

The present invention is related to U.S. patent application Ser. No. 09/588,078 field Jun. 6, 2000.

BACKGROUND OF THE INVENTION

This invention relates to a television camera for acquiring video signals having a broad dynamic range. More particularly, this invention relates to an iris control method and apparatus for a television camera for controlling an iris of a lens in response to video signals picked up by the television camera, and a television camera using the same.

A television camera for acquiring video signals having a broad dynamic range is heretofore known which uses a solid state image pickup device capable of outputting on a time division basis a long-time exposure video signal obtained by photoelectrically converting long-time exposing light beams and a short-time exposure video signal obtained by photoelectrically converting short-time exposing light beams. A lens having an automatic iris control function, that is, an automatic iris lens system is used for this television camera. The automatic iris lens is realized by a DC voltage control system such as a galvanometer system.

Next, a prior art technology of a conventional broad dynamic range television camera using an automatic iris lens system, in which the iris is controlled upon inputting of video signals, will be explained with reference to FIG. 1 showing its construction. In the drawing, an automatic iris lens 17 condenses light beams from an object. The light beams are then incident into a solid state image pickup device (charge-coupled device: CCD) 18. The CCD 18 alternately outputs short-time exposure video signals obtained by exposing the light beams for short exposing period, such as $\frac{1}{2,000}$ seconds, for example, and long-time exposure video signals obtained by exposing the light beams for a longer exposing period than the short exposing period to the short-time exposure video signals, such as about $\frac{1}{60}$ seconds. It will be assumed hereby that time-base compressed long-time exposure video signals for one horizontal scanning and time-base compressed short-time exposure video signals for one horizontal scanning are outputted within one horizontal scanning period. A CDS (correlation double sampling) circuit 19 samples and holds the video signals outputted from the CCD 18. An AGC (automatic gain control) circuit 20 conducts automatic gain control of the video signals so sampled and held to signals having a predetermined level. Further, an A/D (analog-to-digital) converter 21 converts the video signals, which are analog video signals into digital video signals.

The video signals sampled and held by the CDS circuit 19 are further inputted as an iris control signal to an automatic iris lens 17. The automatic iris lens 17 executes iris control in accordance with the iris control signal so inputted.

On the other hand, the digital video signals outputted from the A/D converter 21 are inputted to a synchronization circuit 22, where they are separated into the long-time exposure video signals and the short-time exposure video signals. Both of these signals are time-wise extended to signals having a length of one horizontal scanning period. The synchronization circuit 22 synchronizes the extended long-time exposure video signals and the extended short-time exposure video signals so that they can be outputted simultaneously.

After synchronized in the synchronization circuit 22, the synchronized long-time exposure video signals and the synchronized short-time exposure video signals are inputted to a synthesis circuit 31, where they are synthesized. The resulting video signals of the synthesizing are inputted to a video signal processing circuit 32. After executing a predetermined video signal processing such as gamma correction, enhancer processing, white balance processing, and so forth, for the input video signal, the video signal processing circuit 32 outputs the signal to a post-stage circuit (not shown).

A microcomputer (CPU) 33 controls the operations of the AGC circuit 20, the video signal processing circuit 32 and the synthesis circuit 31, and incorporates software for executing automatic gain control processing, white balance processing, synthesis processing, and so forth.

SUMMARY OF THE INVENTION

On the other hand, the applicant of the present invention has filed a patent application covering a television camera having a construction shown in FIG. 2. The long-time exposure video signals synchronized by the synchronization circuit 22 are inputted to a long-time exposure video signal processing circuit 23. The short-time exposure video signals synchronized by the synchronization circuit 22 are likewise inputted to a short-time exposure video signals processing circuit 24. These long- and short-time exposure video signal processing circuits 23 and 24 execute predetermined video signal processing for each video signal inputted thereto, such as gamma correction processing, enhancer processing and white balance processing.

After being subjected to the predetermined video signal processing by the long-time exposure video signal processing circuit 23 and the short-time video signal processing circuit 24, the long-time exposure video signal and the short-time exposure video signal are both inputted to a synthesis/gray-scale correction processing circuit 25, where they are synthesized by using the synthesizing method for more broadening the dynamic range of the video signals. The resulting video signals of the synthesizing are subjected to gray scale correction processing and are converted to a broad dynamic range video signal. The broad dynamic range video signals are outputted to a post-stage circuit (not shown in the drawing).

The microcomputer (CPU) 26 controls the operations of the AGC circuit 20, the long-time exposure video signal processing circuit 23, the short-time exposure video signal processing circuit 24 and the synthesis/gray-scale correction circuit 25, and incorporates software for executing control such as automatic gain control processing, white balance processing, synthesis processing, etc, for example.

Here, it may be possible to employ iris control directed to a low luminance area picked up objects as iris control of an automatic iris lens of a television camera for acquiring video signals of a broad dynamic range by use of a solid state image pickup device capable of outputting long-time exposure video signals and short-time exposure video signals on the time division basis. Explanation will be given about the case where an object in a low luminance area (inside a dark room where a person exists under illumination of a fluorescent lamp, for example) represented by dots in FIG. 4 is picked up and an object in a high luminance area (brighter outdoor under the solar rays, for example) without dots is picked up. In this case, the synthesizing method of more broadening the dynamic range of the video signals employed in the synthesis circuit 31 and the synthesis/gray-scale correction processing circuit 25 described above is, for example, to select the long-time exposure video signals for the low luminance area and the short-time exposure video signals for the high luminance area, and synthesize these selected video signals.

Assuming that the iris value of the automatic iris lens of the television camera is so controlled as to match only the indoor object, the long-time exposure video signals matching the indoor exposure condition can be obtained among the video signals outputted from the CCD and at the same time, the short-time exposure video signals matching substantially the outdoor exposure condition are outputted if the exposure period for the short-time exposure video signals is controlled. When these long- and short-time exposure video signals are synthesized, the broad dynamic range video signals having excellent gray scales reproduced for both indoor and outdoor objects can be acquired.

In the constructions shown in FIGS. 1 and 2, however, the iris control signal for executing iris control of the automatic iris lens is generated on the basis of the signal in which both long- and short-time exposure video signals exist in mixture. In this case, it is not possible to control the iris in such a fashion as to satisfy only the indoor object by use of such an iris control signal generated on the basis of the mixture signal. When the iris control signal is subjected to mean detection processing inside the automatic iris lens, therefore, the iris value is likely to be so controlled as to match the outdoor object (object of the high luminance area), too, when the object shown in FIG. 4 is picked up.

In the output video signals after synthesis on this likely occasion, gray scale reproduction of the video signals increases for the outdoor object (high luminance area's object), and video signals having mono tone minimum signal level area, such as black batter is likely to occur for the indoor object (low luminance area's object). When the video signal has such dark batter, a video signal having an appropriate broad dynamic range cannot be obtained and not outputted.

It is therefore an object of the present invention to provide an iris control method and apparatus for a television camera for controlling an iris of a lens in response to video signals, capable of solving the problems of the related art described above, and a television camera using the same.

It is another object of the present invention to provide an iris control method and apparatus for a television camera for controlling an iris of a lens in response to video signals which executes control so that iris control of an automatic iris match much more the low luminance area even when the indoor (low luminance area's) object and the outdoor (high luminance area's) object are picked up in mixture as described above, by use of the automatic iris lens for executing iris control on the basis of the signal obtained by subjecting an input video signal to a mean detection processing, and which can therefore obtain broad dynamic range video signals capable of satisfactorily reproducing gray scales for both indoor and outdoor objects, as well as a television camera using the same.

According to one aspect of the present invention for solving the problems described above, an iris control method and apparatus for a television camera divides an image frame of a long-time exposure video signal from a solid state image pickup device for outputting long-time exposure video signals and short-time exposure video signals on the time division basis into a plurality of predetermined areas; detects a first area in which a luminance level of the long-time exposure video signal becomes minimal and a second area other than the detected first area among a plurality of areas of the image frame, from a plurality of areas of the image frame; applies different weighting to the long-time exposure video signal of the first area and to the long-time exposure video signal of the second area; and controls an iris of a lens for condensing the light beams in accordance with the long-time exposure video signal from the solid state imaging device so weighted.

According to one example of the present invention, a detection unit detects an area in which a mean luminance level of the long-time exposure video signals becomes minimal as the first area among a plurality of divided areas.

According to another example of the present invention, a weighting unit applies weighting so that only the video signal level of the long-time exposure video signal of the second area can be decreased.

According to another example of the present invention, the weighting unit applies predetermined weighting to the long-time exposure video signals of the first and second areas so that a decrement ratio of the long-time exposure video signal of the first area becomes greater than a decrement ratio of the level of the long-time exposure video signal of the second area.

According to still another example of the present invention, a control unit applies the weighted long-time exposure video signal to the lens in synchronism with the video signal from the solid state imaging device.

According to the present invention having the construction described above, automatic iris control can be conducted in match with the low luminance area even when two objects having a luminance level such as the indoor (low luminance area's) object and the outdoor (high luminance area's) object are simultaneously picked up in mixture, and a television camera capable of obtaining broad dynamic range video signals having an increased gray scale reproduction capacity both indoor and outdoor can be accomplished.

BRIEF DESCRIPTION OF THE DRAWINGS

FIG. 4 shows an example of an object picked up by a television camera;

FIG. 5 shows an example of division of an image frame into a plurality of areas in the present invention;

FIGS. 6A to 6C show examples of signal waveforms of weighting signals corresponding to the areas of the image frame shown in FIG. 5;

FIG. 8 is a flowchart showing an example of a control operation of a CPU being inside a television camera according to an embodiment of the present invention.

DESCRIPTION OF THE EMBODIMENTS

Figure 1:
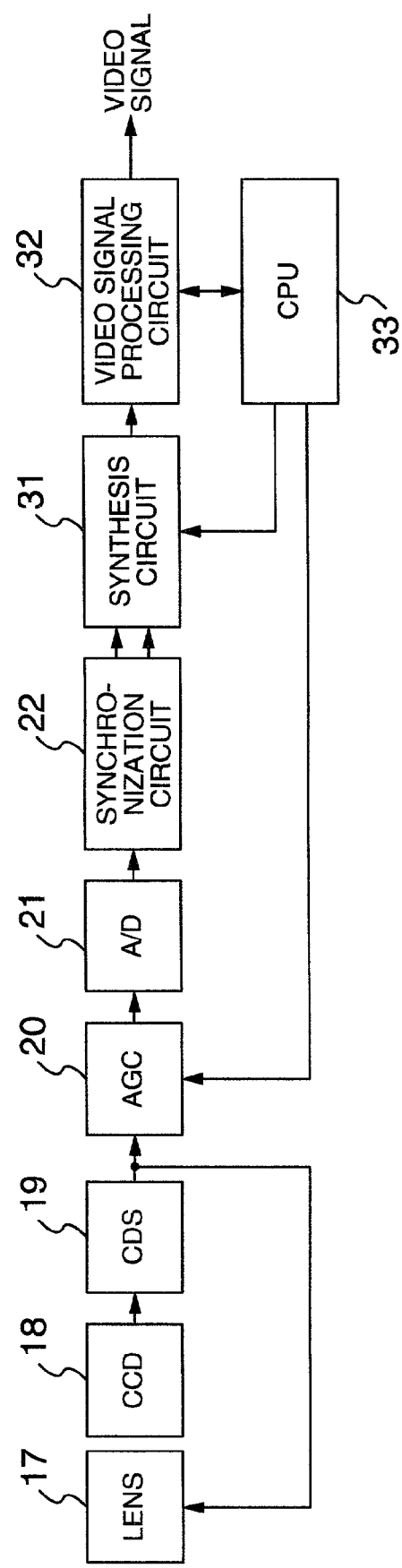
FIG. 1 is a block diagram showing a structural example of a television camera according to the prior art technology.
Figure 2:
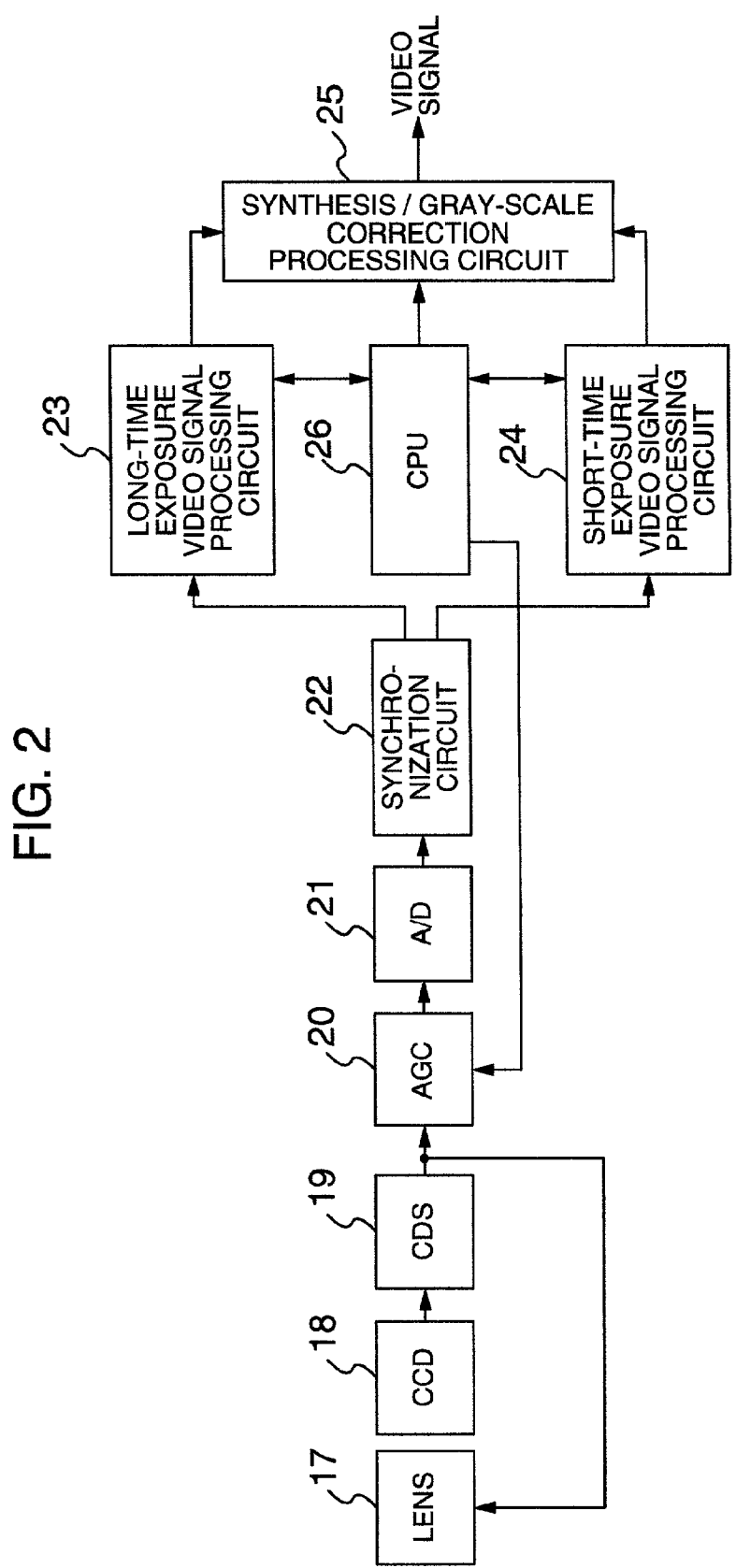
FIG. 2 is a block diagram showing a construction of a television camera according to a related technology of the present invention.
Figure 3:
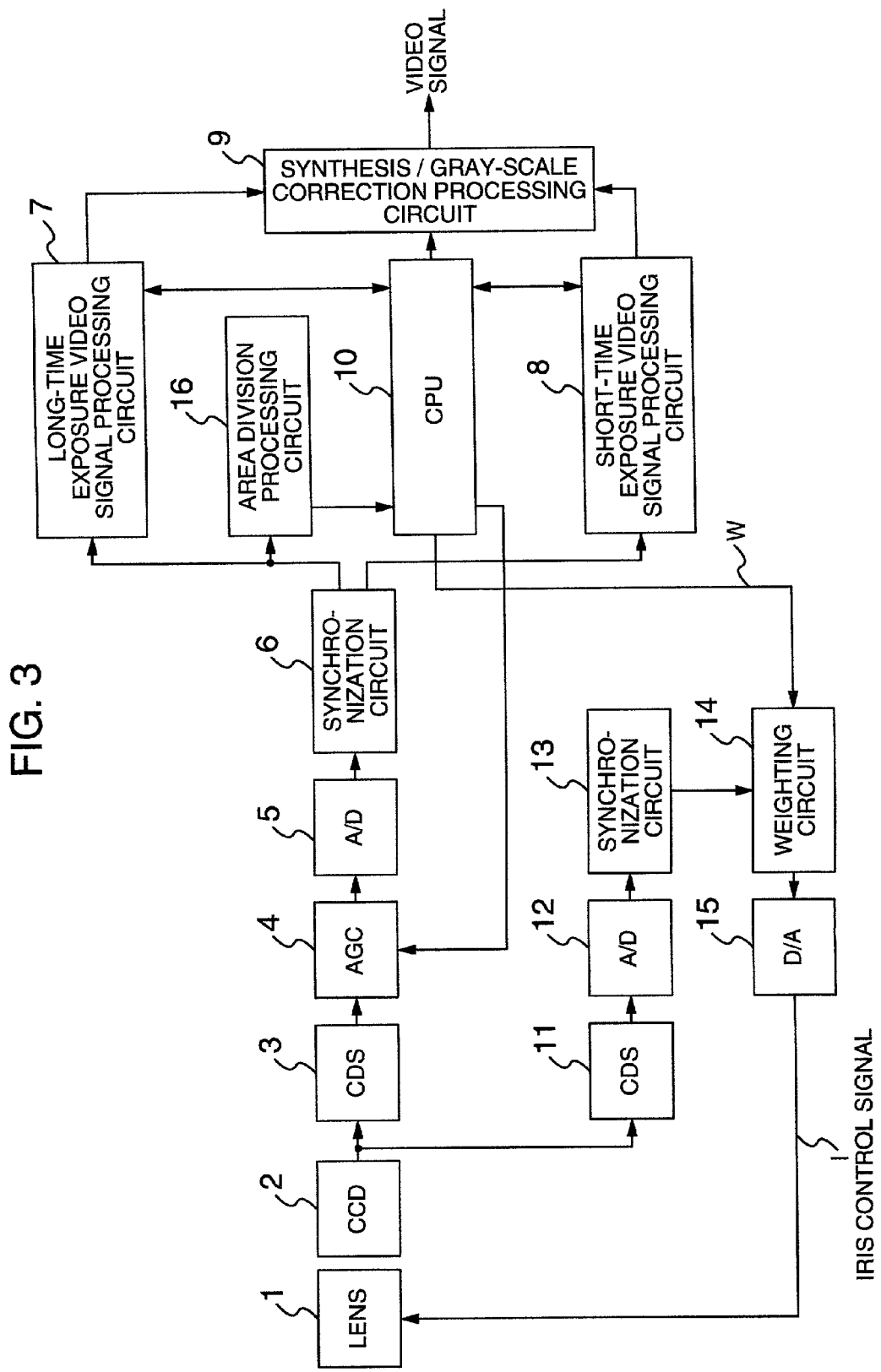
FIG. 3 is a block diagram showing a construction of a television camera according to one embodiment of the present invention.

Hereinafter, a television camera according to an embodiment of the present invention will be explained with reference to FIG. 3.

In the drawing, light beams from an object are condensed by an automatic iris lens 1 and are incident into a solid state image pickup device (CCD) 2. The CCD 2 alternately outputs short-time exposure video signals obtained by exposing the light beams within ½,₀₀₀ seconds, for example, and long-time exposure video signals obtained by exposing the light beams within longer period than the short-time exposure video signals such as ¹⁄₆₀ seconds. Here, the time-base compressed long-time exposure video signals for one horizontal scanning and the time-base compressed short-time exposure video signals for the same one horizontal scanning are outputted within one horizontal scanning period. A CDS circuit 3 samples and holds the video signals outputted from the CCD 2. An AGC circuit 4 conducts automatic gain control of the signals so sampled and held to signals of a predetermined level. Further, an A/D converter 5 converts the video signals, which are analog video signals into digital video signals, after this automatic gain control.

The digital video signals outputted from the A/D converter 5 are inputted to a synchronization circuit 6, where they are separated into the long-time exposure video signals and the short-time exposure video signals and are extended to the signals having a length of one horizontal scanning period, respectively. After this time extension, the long-time exposure video signals and the short-time exposure video signals are simultaneously outputted and synchronized.

The long-time exposure video signals synchronized by the synchronization circuit 6 are inputted to a long-time exposure video signal processing circuit 7. Similarly, the short-time exposure video signals synchronized by the synchronization circuit 6 are inputted to a short-time exposure video signal processing circuit 8. The long-time exposure video signal processing circuit 7 and the short-time exposure video signal processing circuit 8 are subjected to predetermined video signal processing, respectively, such as gamma correction processing, enhancer processing, white balance processing, and so forth.

After being subjected to the predetermined video signal processing by the long- and short-time video signal processing circuits 7 and 8, the long- and short-time exposure video signals are both inputted to a synthesis/gray-scale correction processing circuit 9, where they are synthesized. The video signals so synthesized are then subjected to gray-scale correction and are converted to broad dynamic range video signals. The synthesis/gray-scale correction processing circuit 9 selects the long-time exposure video signals for a low luminance area and the short-time exposure video signals for a high luminance area from video signals of the object to be picked up, and synthesizes these long- and short-time exposure video signals. A synthesizing method of such video signals may use the method disclosed in U.S. patent application Ser. No. 09/588,078 filed by the same assignee as the present application. The broad dynamic range video signals synthesized in this way are outputted to a post-stage circuit (not shown in the drawing).

A microcomputer (CPU) 10 controls the operations of the AGC circuit 4, the long-time video signal processing circuit 7, the short-time exposure video signal processing circuit 8 and the synthesis/gray-scale correction processing circuit 9, and incorporates software for controlling the automatic gain control processing, the white balance processing, the synthesis processing, and the like, thereby to output a control signal for performing the aforesaid various kinds of controls in accordance with the processing using the software.

The video signals outputted from the CCD 2 are inputted to the CDS circuit 3 as described above on one hand, and to a CDS circuit 11 for generating an iris control signal for controlling the iris of the automatic iris lens 1, on the other. The video signals inputted to the CDS circuit 11 are sampled and held there, and are then converted from the analog video signals to the digital video signals by an A/D converter 12.

In this television camera, the CPU 10 detects that the long-time exposure video signals from the long-time exposure video signal processing circuit 7 are lower than a predetermined level when the camera shoots a dark object of a level lower than a predetermined luminance level. In this case, the CPU 10 does not perform the signal amplification based on the automatic gain control for the video signals inputted to, and sampled and held by, the CDS circuit 11 and eventually, the iris of the automatic iris lens 1 can be kept open. It is thus possible to prevent the occurrence of the hunting phenomenon that might occur due to the iris control of the automatic iris lens 1 and its automatic gain control when a dark object below the predetermined luminance level is picked up and when signal amplification is executed by the automatic gain control.

The digital video signals from the A/D converter 12 are inputted to the synchronization circuit 13, where the long-time exposure video signals are separated and are extended time-wise to the signals having the length of one horizontal scanning period, and the long-time exposure video signals time-extended are outputted. Incidentally, the long-time exposure video signals outputted from this synchronization circuit 13 may be synchronized with the video signals outputted from the synchronization circuit 6 described above, and may be then outputted.

The long-time exposure video signals outputted from the synchronization circuit 13 are inputted to a weighting circuit 14. As will be described later in further detail, the weighting circuit 14 applies different weighting to the portion of the input long-time exposure video signals corresponding to the high luminance area of the object to be picked up and its portion corresponding to the low luminance area, and corrects the signal level of the long-time exposure video signals. After the weighting circuit 14 corrects the signal level in this way, the D/A converter 15 converts the long-time exposure video signals from the digital video signal to the analog video signal and outputs the signal as an iris control signal for controlling the automatic iris lens 1. The iris control signal controls the iris of the automatic iris lens 1. The reason why the iris control signal is generated on the basis of the long-time exposure video signals but not of the short-time exposure video signals because the video signal level of the high luminance area of the object can be more greatly suppressed and gray-scale reproducibility of the object in both high and low luminance areas can be improved more greatly.

The operation of the weighting circuit 14 and the control of its operation by the CPU 10 will be hereby explained in detail. First, the long-time exposure video signals outputted from the synchronization circuit 6 are inputted to the long-time exposure video signal processing circuit 7 and to the area division processing circuit 16. The area division processing circuit 16 divides the image frame into a plurality of predetermined areas and calculates mean luminance value data of all the image signals corresponding to the area for each divided area. As shown typically in FIG. 5, the image frame is divided into five areas and processing is conducted in this embodiment. Incidentally, the image frame may well be divided into three or more areas, preferably at least four areas.

The mean luminance value data for each area so calculated is inputted to the CPU 10. FIG. 8 is a flowchart that is useful for explaining an example of the processing operation by the CPU 10. The CPU 10 acquires the mean luminance value data of the five areas from the area division processing circuit 16 (step 100), and detects the area having the lowest mean luminance value data among the five areas, that is, the area having the darkest mean luminance value (hereinafter called the "low luminance area") (step 101). On the basis of this detection result, the CPU 10 sets a parameter or weighting signal W for weighting the long-time exposure video signal outputted from the synchronization circuit 13 so that the video signal level of all the areas other than the darkest area so detected (hereinafter called the "high luminance area") decreases from the present level, and outputs the parameter or the weighting signal W to the weighting circuit 14 (step 102).

Here, weighting to the long-time exposure video signal corresponding to the high luminance area may well be set in such a fashion that the mean luminance value of the video signal of the high luminance area becomes substantially equal (first desired value) to the mean luminance value of the video signal of the low luminance area. Alternatively, weighting may well be made so that the mean luminance value of the video signal of the high luminance area is somewhat greater than the mean luminance value of the video signal of the low luminance area (second desired value) so long as the object existing in the low luminance area does not undergo black battering.

Further, predetermined weighting may well be applied to the long-time exposure video signals so that the decrement ratio of the video signal level of the high luminance area becomes greater than the decrement ratio of the video signal level of the low luminance area.

Setting of such weighting (that is, the set value of the parameter or the weighting signal W) may be subjected to gradual feedback control so that the mean luminance value of the video signals of the high luminance area reaches the first or second desired value described above. It is further possible to secure a table in a memory (e.g. RAM) inside the CPU 10, to write in advance the level of the parameter or the weighting signal W corresponding to the first or second desired value in accordance with the mean luminance value of the video signals of the high luminance area and the mean luminance value of the video signals of the low luminance area, and to read and output the level of the parameter or the weighting signal W in accordance with the mean luminance value of the video signals of the high luminance area and the mean luminance value of the video signals of the low luminance area.

The steps 101 to 103 may be conducted for each frame of the video signal or for a plurality of frames.

The parameter or the weighting signal W for such weighting is outputted from the CPU 10 to the weighting circuit 14. The weighting circuit 14 inputs such a parameter or weighting signal W, applies different weighting to the portion of the long-time exposure video signal inputted from the synchronization circuit 13 corresponding to the high luminance area of the object to be picked up, and to the portion corresponding to the low luminance area of the object in accordance with the parameter or the weighting signal W so inputted. In consequence, the iris control signal that is corrected so that the image signal level of the high luminance area decreases from the present level can be acquired.

The correction method of the video signal level will be explained with reference to FIGS. 4, 5, 6A to 6C and 7A to 7H. Here, the explanation will be given on the case where the CPU 10 outputs the weighting signal W, and also on the concrete example of the weighting signal W.

In the example shown in FIG. 4, the high luminance area corresponds to the area 3 in FIG. 5 and the low luminance area corresponds to the other areas 1–2 and 4–5 in FIG. 5. Therefore, different weighting is applied to the portion of the long-time exposure video signal corresponding to the area 3 and its portions corresponding to the areas 1–2 and 4–5. More concretely, weighting is applied so that the image signal level of the area 3 decreases from the present level. In FIG. 5, therefore, a vertical scanning area Va1 includes the areas 2 and 3 partially, and a weighting signal W1 corresponding to the horizontal scanning line L1 of the area Va1 is set so that the portion corresponding to the area 2 and the portion corresponding to the area 3 have different levels, such as the low level for the portion corresponding to the area 2 and the high level for the portion corresponding to the area 3 as shown in FIG. 6A. Similarly, a vertical scanning area Va2 contains the areas 1, 2 and 3 partially. The weighting signal W2 corresponding to the horizontal scanning line L2 in this area Va2 is set so that the portion corresponding to the areas 2 and 1 assumes the low level and the portion corresponding to the area 3 assumes the high level as shown in FIG. 6B. On the other hand, the vertical scanning areas Va3 and Va4 do not contain the area 3 but include partially the areas 1, 4 and 5 and the areas 4 and 5, respectively. Therefore, the weighting signals W3 and W4 corresponding to the horizontal scanning lines L3 and L4 in the vertical scanning areas Va3 and Va4 assume the low level as shown in FIG. 6C.

These weighting signals are outputted from the CPU 10 in synchronism with the long-time exposure video signals outputted from the synchronization circuit 13.

FIGS. 7A to 7F show the correspondence between the level of each weighting signal W1 to W4 and the signal level of the iris control signal in each vertical scanning area Va1 to Va4.

Figure 7A:
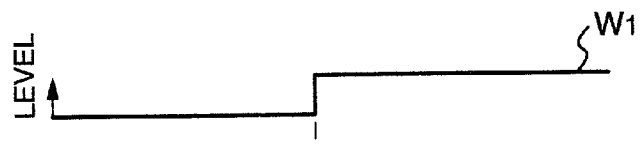
FIGS. 7A to 7F show examples of weighting signals corresponding to the areas of the image frame shown in FIG. 5 and iris control signals.
Figure 7B:
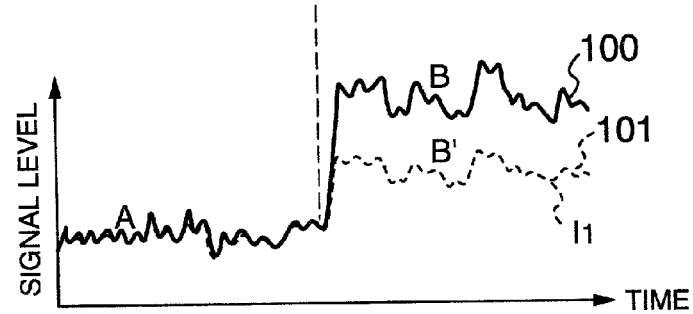

FIGS. 7A and 7B show the waveform of the weighting signal W1 and that of the iris control signal I1 weighted in accordance with the weighting signal W1. In FIG. 7B, the waveform of the iris control signal before weighting, that is represented by solid line 100 (the long-time exposure video signal outputted from the synchronization circuit 13), includes the area having the darkest mean luminance value of the signal level (low luminance area) A (corresponding to the area 2 in FIG. 5) and other areas (high luminance areas) B (corresponding to the area 3 in FIG. 5). As described above, the area A in this embodiment corresponds to the low luminance area of the indoor object picked up, and the area B corresponds to the high luminance area of the outdoor object picked up. Here, the level of the iris control signal is controlled in accordance with the level of the weighting signal W1 as described above. More concretely, while the weighting signal W1 is at the low level (corresponding to the area 2 in FIG. 5), the level of the iris control signal of the area A is not altered but while the weighting signal W1 is at the high level (corresponding to the area 3 in FIG. 5), the level of the iris control signal of the area B is decreased from the present level and describes the waveform indicated by dotted line 101.

The waveform of the iris control signal that is obtained by the weighting processing and is indicated by the dotted line 101 has a smaller mean luminance value of the signal level of the area B' of the dotted line 101 than the signal level of the area B of the solid line 100. For example, the iris control signal I1 obtained in this way is outputted from the D/A converter 15 and is applied to the lens at a timing at which it controls the lens 1 in synchronism with the video signal of the next frame (or of an arbitrary subsequent frame) outputted from the CCD 18.

Figure 7C:
Figure 7D:

FIGS. 7C and 7D show the waveforms of the weighting signals W2 in the vertical scanning area Va2 and the iris control signal I2 that is weighted in accordance with the former. While the weighting signal W2 is at the low level (corresponding to the areas 2 and 1 in FIG. 5), the level of the iris control signal I2 of the area C is not altered but while the weighting signal W2 is at the high level (corresponding to the area 3 in FIG. 5), the level of the iris control signal I2 of the area D is decreased correspondingly from the present level and describes the waveform indicated by dotted line 103. Incidentally, solid line 102 represents the waveform of the iris control signal before weighting.

Figure 7E:
Figure 7F:
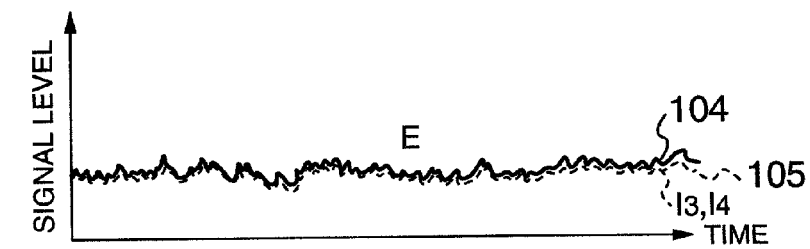

FIGS. 7E and 7F show the waveforms of the weighting signals W3 in the vertical scanning area Va3 and the iris control signal I3 that is weighted in accordance with the former. The weighting signal W3 remains at the low level as a whole (corresponding to the areas 4, 1 and 5 in FIG. 5), and the level of the iris control signal I3 of the whole area E remains unaltered correspondingly. Therefore, the levels of the iris control signal I3 before and after weighting have the same waveform as represented by solid line 104 and dotted line 105.

Similarly, FIGS. 7E and 7F show the waveforms of the weighting signal W4 in the vertical scanning area Va4 and the iris control signal I4 weighted in accordance with this signal W4. The weighting signal W4 remains at the low level as a whole in the same way as the signal W3 (corresponding to the areas 4 and 5 in FIG. 5), and the level of the iris control signal I4 of the whole area E remains unaltered correspondingly. Therefore, the levels of the iris control signal I4 before and after weighting have the same waveform as represented by solid line 104 and dotted line 105.

Incidentally, the iris control signal may be outputted from the D/A converter 15 at a timing at which it controls the lens 1 in synchronism with the video signal of an arbitrary subsequent frame outputted from the CCD 18. In this case, response of the iris control can be retarded.

When such weighting is executed, more appropriate iris control can be conducted by use of the light beams from the object in the low luminance area in iris control of the automatic iris lens 1 depending on the weighted iris control signal of the dotted line 101.

Although, in the aforesaid embodiment, the explanation has been made that each of the weighing signals W (W1 to W4) is a binary signal with a low and a high level, the value of each of the weighting signals may take a value according to a mean luminance value of each area. In this case, each of the weighing signals W may be a multi-value signal taking three or more values. The iris control signal for the area except for the area which mean luminance level is minimum performs the weighting operation in accordance with the weighting signal W of the area.

As explained above, even when two objects having a difference of a luminance level are simultaneously picked up such as an indoor object (low luminance area) and an outdoor object (high luminance area), the present invention can conduct automatic iris control so that iris control of the automatic iris lens matches more properly the low luminance area, and can therefore accomplish a television camera capable of obtaining broad dynamic range video signals having an increased reproduction capacity of gray scale both indoor and outdoor.

What is claimed is:

1. An iris control apparatus of a television camera comprising:
   a solid state image pickup device for outputting on a time division basis a long-time exposure video signal obtained from light beams exposing an object for a long time and a short-time exposure video signal obtained from said light beams exposing said object for a short time;
   a division unit for dividing an image screen displayed by said long-time exposure video signal into a plurality of predetermined areas;
   a detection unit for detecting a first and a second area, each of which has a different luminance level of said long-time exposure video signal;
   a weighting unit for applying different weighting to said long-time exposure video signals of said first and second areas, respectively; and
   a control unit for controlling an iris of a lens, through which said light beams are applied to said solid state image pickup device, in response to said weighted long-time exposure video signal.

2. An iris control apparatus according to claim 1, wherein said first area is an area in which a mean luminance level of said long-time exposure video signal becomes minimal.

3. An iris control apparatus according to claim 1, wherein said weighting unit applies weighting so that the video signal level of said long-time exposure video signal of said second area is decreased.

4. An iris control apparatus according to claim 1, wherein said weighting unit applies predetermined weighting so that a decrement ratio of a level of said long-time exposure video signal of said first area becomes greater than that of said long-time exposure video signal of said second area.

5. An iris control apparatus according to claim 1, wherein said control unit applies said weighted long-time exposure video signal to said iris of said lens in synchronism with the video signal from said solid state image pickup device.

6. A television camera comprising:
   a lens unit having an iris;
   a solid state image pickup device, to which light beams from an object are applied through said lens, for outputting on a time division basis a long-time exposure video signal obtained from said light beams exposing said object for a long time and a short-time exposure video signal obtained from said light beams exposing said object for a short time;
   a division unit for dividing an image screen displayed by said long-time exposure video signal into a plurality of predetermined areas;
   a detection unit for detecting a first and a second area, each of which has a different luminance level of said long-time exposure video signal;
   a weighting unit for applying different weighting to said long-time exposure video signals of said first and second areas, respectively;
   a synthesis unit for synthesizing said long-time exposure video signal and said short-time exposure video signal; and a control unit for controlling said iris of said lens in response to said weighted long-time exposure video signal.

7. A television camera according to claim 6, wherein said weighting unit applies weighting so that the video signal level of said long-time exposure video signal of said second area is decreased.

8. An iris control method of a television camera comprising the steps of:
   outputting on a time division basis a long-time exposure video signal obtained from light beams exposing an object for a long time and a short-time exposure video signal obtained from light beams exposing said object for a short time;
   b) dividing an image screen displayed by said long-time exposure video signal into a plurality of predetermined areas;
   c) detecting a first and a second area each of which has a different luminance level of said long-time exposure video signal;
   d) applying different weighting to said long-time exposure video signals of said first and second areas, respectively; and
   e) controlling an iris of a lens, through which said light beams are applied to said solid state image pickup device, in response to said weighted long-time exposure video signal.

9. An iris control method according to claim 8, wherein said first area is an area in which the luminance level of said long-time exposure video signal becomes minimal.

10. An iris control method according to claim 8, wherein said step d) applies weighting so that the video signal level of said long-time exposure video signal of said second area is decreased.

11. An iris control method according to claim 8, wherein said step d) applies predetermined weighting so that a decrement ratio of a level of said long-time exposure video signal of said first area becomes greater than that of said long-time exposure video signal of said second area.

12. An iris control method according to claim 8, wherein said step e) applies said weighted long-time exposure video signal to said iris of said lens in synchronism with the video signal from said solid state image pickup device.

* * * * *